United States Patent
Kung et al.

(10) Patent No.: US 9,973,075 B2
(45) Date of Patent: May 15, 2018

(54) METHOD FOR PERFORMING ADAPTIVE INPUT CURRENT CONTROL IN AN ELECTRONIC DEVICE WITH AID OF ADAPTOR MANAGEMENT, AND ASSOCIATED APPARATUS

(71) Applicant: MEDIATEK INC., Hsin-Chu (TW)

(72) Inventors: Nien-Hui Kung, Hsinchu (TW); Kuo-Chang Lo, Taipei (TW); Chia-Hsiang Lin, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 51 days.

(21) Appl. No.: 15/008,406

(22) Filed: Jan. 27, 2016

(65) Prior Publication Data

US 2017/0025944 A1    Jan. 26, 2017

Related U.S. Application Data

(60) Provisional application No. 62/195,931, filed on Jul. 23, 2015.

(51) Int. Cl.
*H02M 1/32* (2007.01)
*H02M 1/36* (2007.01)
(Continued)

(52) U.S. Cl.
CPC ............ *H02M 1/32* (2013.01); *H02M 1/36* (2013.01); *H02M 7/217* (2013.01); *G06F 1/28* (2013.01);
(Continued)

(58) Field of Classification Search
CPC .......... H02M 1/32; H02M 1/36; H02M 7/217; H02M 2001/0016; H02M 2001/0025; G05F 5/00
See application file for complete search history.

(56) References Cited

U.S. PATENT DOCUMENTS 4,866,373 A * 9/1989 Harada ................ G01R 17/06
324/127
7,990,106 B2    8/2011 Hussain
(Continued)

FOREIGN PATENT DOCUMENTS

CN    104600813 A    5/2015
JP    2013196177 A    9/2013

*Primary Examiner* — Jue Zhang
*Assistant Examiner* — Lakaisha Jackson
(74) *Attorney, Agent, or Firm* — Wolf, Greenfield & Sacks, P.C.

(57) ABSTRACT

A method and apparatus for performing adaptive input current control in an electronic device are provided, where the method may include the steps of: before limiting an input current of a regulator of the electronic device to a target current value, monitoring the input current of the regulator according to a reference current, and decreasing the reference current, to make the reference current change starting from one of a plurality of predetermined reference current values, wherein the input current is obtained from a power source; detecting an input voltage of the regulator to generate a detection signal, to selectively trigger limiting output power of the regulator; and at a time point when the reference current becomes smaller than the input current, limiting the input current of the regulator to the target current value with a latest reference current value of the reference current being utilized as the target current value.

20 Claims, 5 Drawing Sheets

(51) Int. Cl.
　　　*H02M 7/217*　　　(2006.01)
　　　*H02M 1/00*　　　(2006.01)
　　　*G06F 1/28*　　　(2006.01)

(52) U.S. Cl.
　　　CPC ............... *H02M 2001/0016* (2013.01); *H02M 2001/0025* (2013.01)

(56) References Cited

U.S. PATENT DOCUMENTS

| | | | |
|---|---|---|---|
| 2008/0258688 A1 | 10/2008 | Hussain | |
| 2011/0210762 A1* | 9/2011 | Hirose | H03K 5/2481 327/73 |
| 2012/0215468 A1 | 8/2012 | Geris | |
| 2013/0176004 A1* | 7/2013 | Lai | H02M 3/1563 323/234 |
| 2013/0334889 A1* | 12/2013 | Hu | H02M 1/32 307/82 |
| 2014/0077757 A1* | 3/2014 | Liu | H02J 3/385 320/107 |
| 2016/0233713 A1* | 8/2016 | Cheng | H02J 7/0083 |

\* cited by examiner

METHOD FOR PERFORMING ADAPTIVE INPUT CURRENT CONTROL IN AN ELECTRONIC DEVICE WITH AID OF ADAPTOR MANAGEMENT, AND ASSOCIATED APPARATUS

CROSS REFERENCE TO RELATED APPLICATIONS

This application claims the benefit of U.S. Provisional Application No. 62/195,931, which was filed on Jul. 23, 2015, and is included herein by reference.

BACKGROUND

The present invention relates to regulating control (e.g. charger control) in a portable electronic device, and more particularly, to a method for performing adaptive input current control in an electronic device, and an associated apparatus.

According to the related art, a conventional regulating control circuit in a conventional portable electronic device may be designed to prevent some problems such as system crash caused by insufficient power of a conventional external power source (e.g. an alternating current (AC)-to-direct current (DC) adaptor). However, further problems such as some side effects may occur. For example, a conventional regulator of the conventional portable electronic device may be arranged for regulating the voltage and the current obtained from the conventional external power source, and in an initial time period (e.g. the conventional external power source is just connected to the conventional portable electronic device), the conventional charger control circuit may adjust the input current setting of the conventional regulator from low to high, to make the input current of the conventional regulator increase with various steps, which typically limits the power to a conventional system circuit of the conventional portable electronic device and limits the power to a battery of the conventional portable electronic device during the initial time period. Thus, the conventional portable electronic device may suffer from limited power-outputting capability during the initial time period. In addition, as this conventional charger control circuit may adjust the input current setting of the conventional regulator from low to high, to make the input voltage of the conventional regulator decrease and temporarily become lower than a power source collapse level before an optimized current level can be achieved, the conventional external power source may crash during operations of the conventional portable electronic device, which may cause unstable system power of the conventional portable electronic device. Thus, a novel architecture is required to improve regulating control of electronic devices, in order to guarantee the overall performance of the electronic devices.

SUMMARY

It is an objective of the claimed invention to provide a method for performing adaptive input current control in an electronic device, and an associated apparatus, in order to solve the above-mentioned problems.

It is another objective of the claimed invention to provide a method for performing adaptive input current control in an electronic device, and an associated apparatus, in order to keep high stability of the electronic device in each of various situations.

It is another objective of the claimed invention to provide a method for performing adaptive input current control in an electronic device, and an associated apparatus, in order to reduce the charging time of a charger within the electronic device.

According to at least one preferred embodiment, a method for performing adaptive input current control in an electronic device is provided, where the method may be applied to the electronic device. The method may comprises the steps of: before limiting an input current of a regulator of the electronic device to a target current value, monitoring the input current of the regulator according to, for example, a reference signal corresponding to a reference current, and decreasing the reference current, for example, by decreasing magnitude of the reference signal corresponding to the reference current, to make the reference current change starting from one of a plurality of predetermined reference current values, wherein the input current is obtained from a power source; detecting an input voltage of the regulator to generate a detection signal corresponding to the input voltage, to selectively trigger limiting output power of the regulator, wherein limiting the output power of the regulator is selectively triggered according to the detection signal; and at a time point when the reference current becomes smaller than the input current (e.g. at the time point when a monitoring result indicates that the reference current becomes smaller than the input current, wherein the monitoring result may be generated from monitoring the input current of the regulator), limiting the input current of the regulator to the target current value with a latest reference current value of the reference current being utilized as the target current value. For example, limiting the input current of the regulator to the target current value may be selectively triggered according to a digital version of the detection signal.

According to at least one preferred embodiment, an apparatus for performing adaptive input current control in an electronic device is provided, where the apparatus may comprise at least one portion (e.g. a portion or all) of the electronic device. For example, the apparatus may comprise: a regulator that is positioned in the electronic device; an error control circuit that is positioned in the electronic device and coupled to the regulator; a voltage monitoring circuit that is positioned in the electronic device and coupled to the regulator; and a management circuit that is positioned in the electronic device and coupled to the regulator, the error control circuit, and the voltage monitoring circuit. The regulator is arranged for performing regulation for the electronic device. In addition, the error control circuit is arranged for performing error control during limiting an input current of the regulator to a target current value, wherein the input current is obtained from a power source. Additionally, the voltage monitoring circuit is arranged for detecting an input voltage of the regulator to generate a detection signal corresponding to the input voltage. Further, the management circuit is arranged for managing the regulator. For example, before limiting the input current to the target current value, the management circuit may monitor, by utilizing the error control circuit, the input current of the regulator according to, for example, a reference signal corresponding to a reference current, and may decrease the reference current, for example, by decreasing magnitude of the reference signal corresponding to the reference current, to make the reference current change starting from one of a plurality of predetermined reference current values, wherein according to the detection signal, the management circuit may selectively trigger limiting output power of the regulator, and at a time point when the reference current becomes smaller than the input current (e.g. at the time point when a monitoring result indicates that the reference current becomes smaller than the input current, wherein the monitoring result may be generated from monitoring the input current of the regulator), the management circuit may limit, by utilizing the error control circuit, the input current of the regulator to the target current value with a latest reference current value of the reference current being utilized as the target current value. For example, limiting the input current of the regulator to the target current value may be selectively triggered according to a digital version of the detection signal.

It is an advantage of the present invention that the present invention method and apparatus can keep high stability of the electronic device in each of various situations, and the related art problems (e.g. the problem that the conventional external power source may crash during operations of the conventional portable electronic device, and the problem of limited power-outputting capability of the conventional portable electronic device during the initial time period mentioned above) will no longer be an issue. In addition, the present invention method and apparatus can reduce the overall charging time of the charger.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
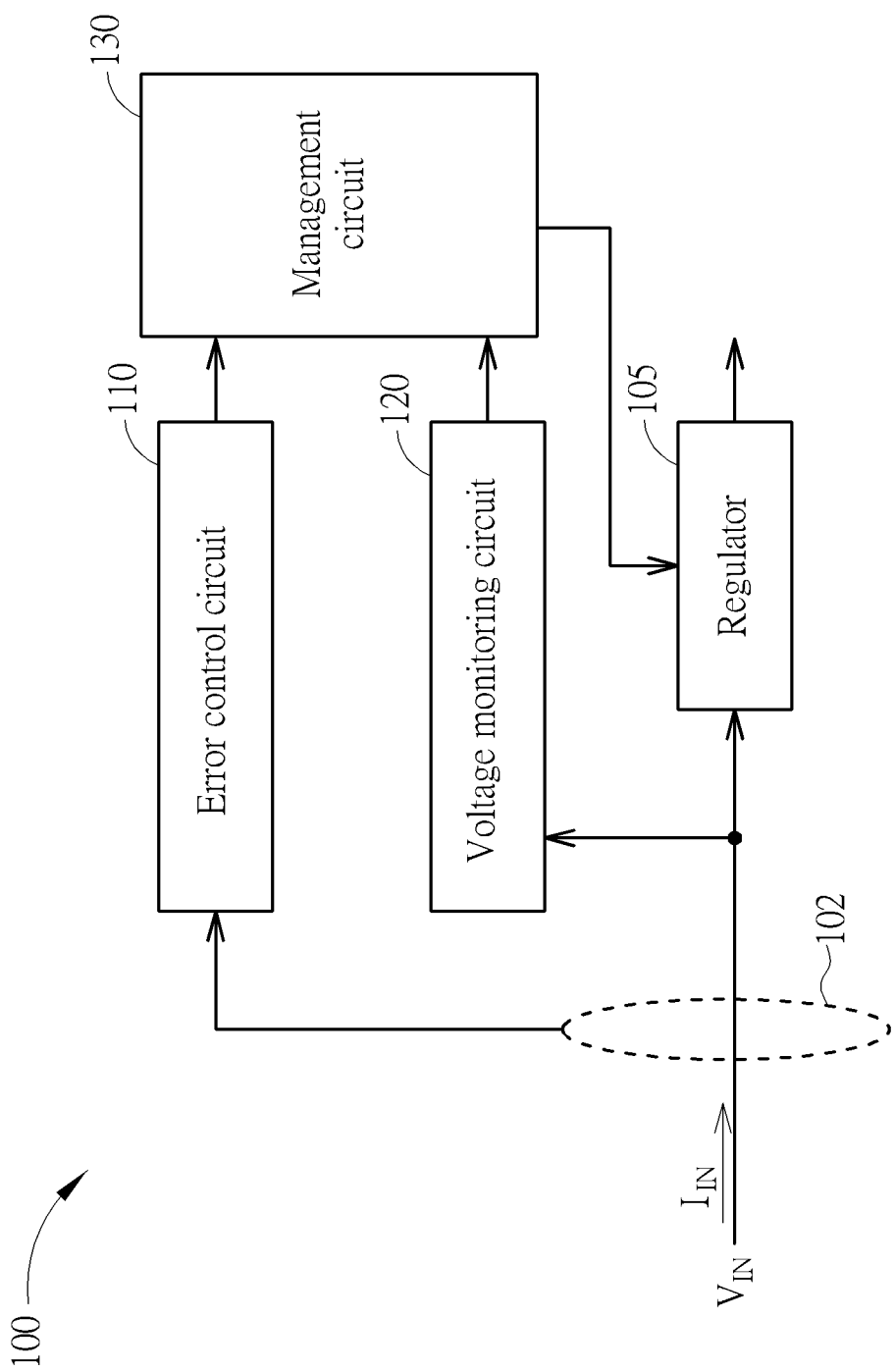
FIG. 1 is a diagram of an apparatus for performing adaptive input current control in an electronic device according to an embodiment of the present invention.

FIG. 1 is a diagram of an apparatus 100 for performing adaptive input current control in an electronic device according to an embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above (e.g. a wireless communications system comprising the electronic device). Examples of the electronic device may include, but not limited to, a mobile phone (e.g. a multifunctional mobile phone), a tablet, and a personal computer such as a laptop computer or a desktop computer.

As shown in FIG. 1, the apparatus 100 may comprise a regulator 105 that is positioned in the electronic device, an error control circuit 110 that is positioned in the electronic device and coupled to the regulator 105, a voltage monitoring circuit 120 that is positioned in the electronic device and coupled to the regulator 105, and a management circuit 130 that is positioned in the electronic device and coupled to the regulator 105, the error control circuit 110, and the voltage monitoring circuit 120. Examples of the regulator 105 may include, but not limited to, a step-down regulator, a step-up regulator, and an up-down regulator. According to this embodiment, the regulator 105 is arranged for performing regulation for the electronic device, to provide power to a main system circuit of the electronic device and/or charge a battery of the electronic device. In addition, the error control circuit 110 is arranged for performing error control during limiting an input current $I_{IN}$ of the regulator 105 to a target current value, where the input current $I_{IN}$ is obtained from a power source such as an external power source. Examples of the external power source may include, but not limited to, an alternating current (AC)-to-direct current (DC) adaptor. Additionally, the voltage monitoring circuit 120 is arranged for monitoring an input voltage $V_{IN}$ of the regulator 105, and more particularly, detecting the input voltage $V_{IN}$ of the regulator 105 to generate at least one detection result (e.g. one or more detection results) corresponding to the input voltage $V_{IN}$. For example, the apparatus 100 may further comprise a current monitoring circuit 102 that is positioned in the electronic device and coupled to the regulator 105, and current monitoring circuit 102 may be arranged for monitoring the input voltage $V_{IN}$ of the regulator 105 for the error control circuit 110. This is for illustrative purposes only, and is not meant to be a limitation of the present invention. According to some embodiments of the present invention, the current monitoring circuit 102 may be integrated into the error control circuit 110. Further, as the management circuit 130 may receive some outputs of the error control circuit 110 and the voltage monitoring circuit 120 and perform some determination operations according to these outputs, the management circuit 130 may be arranged for managing the regulator 105 with aid of the error control circuit 110 and the voltage monitoring circuit 120.

Figure 2:
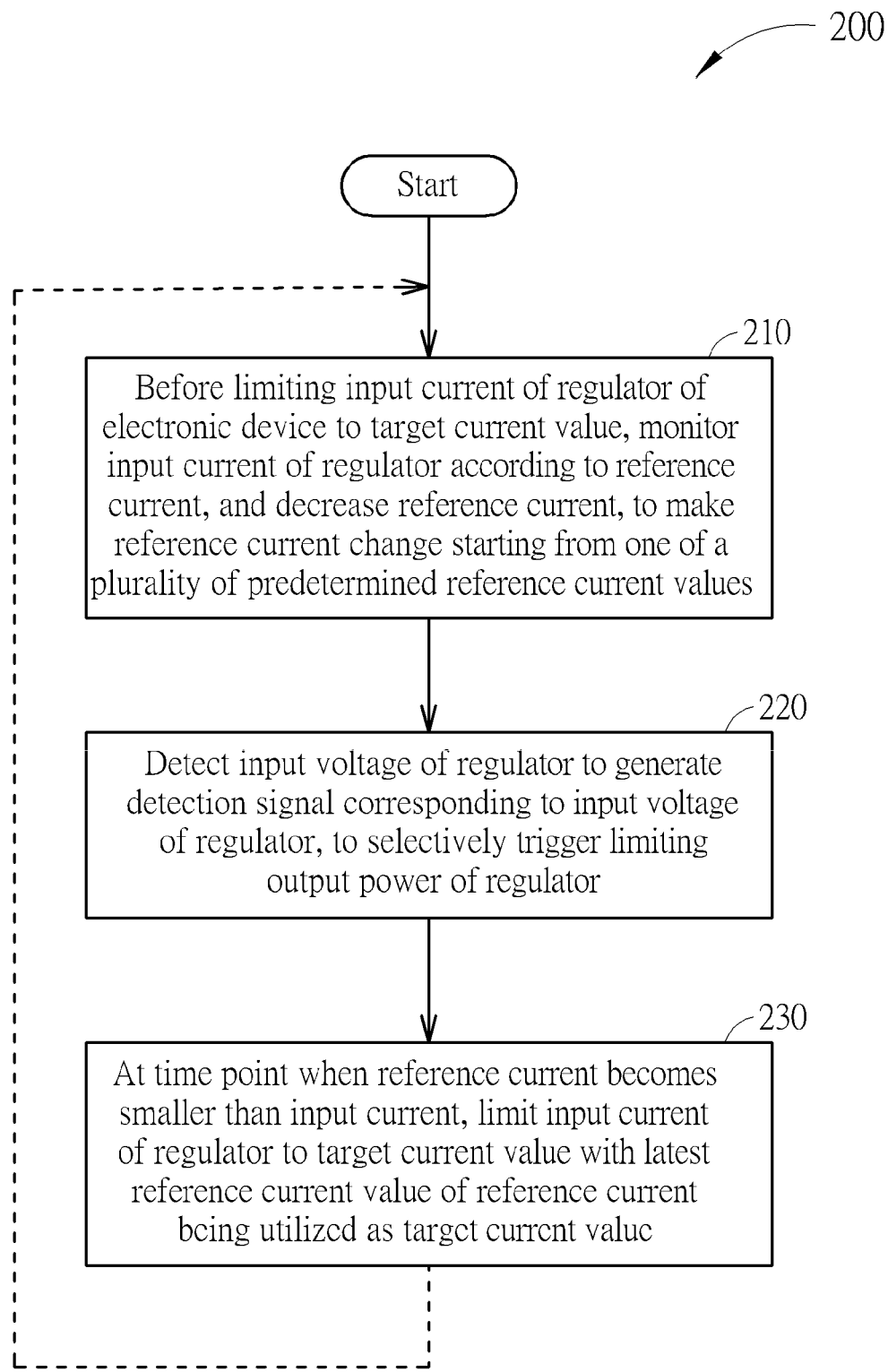
FIG. 2 illustrates a flowchart of a method for performing adaptive input current control in an electronic device according to an embodiment of the present invention.

FIG. 2 illustrates a flowchart of a method 200 for performing adaptive input current control in an electronic device according to an embodiment of the present invention. The method 200 shown in FIG. 2 can be applied to the apparatus 100 shown in FIG. 1 and the components thereof, and more particularly, can be applied to the management circuit 130. The method can be described as follows.

In Step 210, before limiting the input current $I_{IN}$ of the regulator 105 of the electronic device to the target current value, the management circuit 130 may monitor, by utilizing the error control circuit 110, the input current $I_{IN}$ of the regulator 105 according to, for example, a reference current $I_{REF}$, and may decrease the reference current $I_{REF}$, to make the reference current $I_{REF}$ change starting from one of a plurality of predetermined reference current values, where the input current is obtained from the power source such as the external power source mentioned in the embodiment shown in FIG. 1 (e.g. the AC-to-DC adaptor). For example, the one of the plurality of predetermined reference current values mentioned in Step 210 may be greater than the maximum current available from the power source. In addition, before limiting the input current $I_{IN}$ to the target current value, the management circuit 130 may allow the input current $I_{IN}$ to reach the maximum current available from the power source.

In Step 220, the management circuit 130 may detect, by utilizing the voltage monitoring circuit 120, the input voltage $V_{IN}$ of the regulator 105 to generate a detection signal corresponding to the input voltage $V_{IN}$ of the regulator 105, to selectively trigger limiting output power of the regulator 105, where limiting the output power of the regulator 105 is selectively triggered according to the detection signal. For example, the detection signal may carry the aforementioned at least one detection result. In this embodiment, according to the detection signal, the management circuit 130 may selectively trigger limiting the output power of the regulator 105, in order to prevent collapse of the input voltage $V_{IN}$ that is obtained from the power source.

In Step 230, at a time point when the reference current $I_{REF}$ becomes smaller than the input current $I_{IN}$, the management circuit 130 may limit, by utilizing the error control circuit 110, the input current $I_{IN}$ of the regulator 105 to the target current value with a latest reference current value of the reference current $I_{REF}$ being utilized as the target current value. For example, according to a digital version of the detection signal, the management circuit 130 may selectively trigger limiting the input current $I_{IN}$ of the regulator 105 to the target current value. This is for illustrative purposes only, and is not meant to be a limitation of the present invention. According to some embodiments of the present invention, limiting the input current $I_{IN}$ of the regulator 105 to the target current value may be automatically performed by the error control circuit 110, where it is unnecessary to utilize the digital version of the detection signal to selectively trigger limiting the input current $I_{IN}$ of the regulator 105 to the target current value.

Please note that the operation of Step 210, the operation of Step 220, and the operation of Step 230 are illustrated in FIG. 2, respectively. This is for illustrative purposes only, and is not meant to be a limitation of the present invention. According to some variations of this embodiment, at least one portion (e.g. a portion or all) of the operation of Step 210 and at least one portion (e.g. a portion or all) of the operation of Step 220 can be performed at the same time. In addition, when needed (e.g. the power-outputting capability of the power source is changed), Step 210 may be re-entered (e.g. the arrow illustrated with dashed lines in FIG. 2), so the working flow starting from Step 210 through to Step 230 may be performed another time for the power source corresponding to the latest status thereof.

According to some embodiments, the monitoring operations performed in Step 210 may be performed based on a reference signal corresponding to the reference current $I_{REF}$, rather than the reference current $I_{REF}$ itself. More particularly, the reference signal may represent the reference current $I_{REF}$, and the management circuit 130 may decrease the magnitude of the reference signal corresponding to the reference current $I_{REF}$, as if the management circuit 130 is decreasing the reference current $I_{REF}$. For example, it is unnecessary that the reference current $I_{REF}$ really exists in the architecture shown in FIG. 1.

According to some embodiments, in Step 210, before limiting the input current $I_{IN}$ of the regulator 105 of the electronic device to the target current value, the management circuit 130 may monitor, by utilizing the error control circuit 110, the input current $I_{IN}$ of the regulator 105 according to, for example, the reference signal corresponding to the reference current $I_{REF}$, and may decrease the reference current $I_{REF}$, for example, by decreasing the magnitude of the reference signal corresponding to the reference current $I_{REF}$, to make the reference current $I_{REF}$ change starting from one of a plurality of predetermined reference current values. In addition, in Step 220, the management circuit 130 may detect, by utilizing the voltage monitoring circuit 120, the input voltage $V_{IN}$ of the regulator 105 to generate the detection signal corresponding to the input voltage $V_{IN}$ of the regulator 105, to selectively trigger limiting output power of the regulator 105. Additionally, in Step 230, at the time point when the reference current $I_{REF}$ becomes smaller than the input current $I_{IN}$ (e.g. at the time point when a monitoring result indicates that the reference current $I_{REF}$ becomes smaller than the input current $I_{IN}$, where the monitoring result may be generated from monitoring the input current $I_{IN}$ of the regulator 105) the management circuit 130 may limit, by utilizing the error control circuit 110, the input current $I_{IN}$ of the regulator 105 to the target current value with the latest reference current value of the reference current $I_{REF}$ being utilized as the target current value.

According to some embodiments, in a situation where the digital version of the detection signal is utilized for selectively triggering limiting the input current $I_{IN}$ of the regulator 105 to the target current value, before the digital version of the detection signal transits from a first logical state to a second logical state, the management circuit 130 may prevent triggering limiting the input current $I_{IN}$ of the regulator 105 to the target current value. For example, when the digital version of the detection signal transits from the first logical state to the second logical state, the management circuit 130 may trigger limiting the input current $I_{IN}$ of the regulator 105.

According to some embodiments, before the detection signal transits from a first state (e.g. a first voltage level) to a second state (e.g. a second voltage level), the management circuit 130 may keep decreasing the reference current. For example, when the detection signal transits from the first state to the second state, the management circuit 130 may stop decreasing the reference current $I_{REF}$, to utilize the latest reference current value of the reference current $I_{REF}$ at the time point (more particularly, the latest reference current value corresponding to the time point mentioned in Step 230) as the target current value.

According to some embodiments, the error control circuit 110 may comprise a first error amplifier (not shown in FIG. 1 and FIG. 2). For example, the first error amplifier may have a monitoring input terminal and a reference input terminal, where the monitoring input terminal of the first error amplifier may be arranged for inputting a monitoring signal corresponding to the input current $I_{IN}$, and the reference input terminal of the first error amplifier may be arranged for inputting the reference signal corresponding to the reference current $I_{REF}$. For example, the reference signal corresponding to the reference current $I_{REF}$ may be equivalent to the reference current $I_{REF}$ in some embodiments. This is for illustrative purposes only, and is not meant to be a limitation of the present invention. According to some embodiments, it is unnecessary that the reference signal corresponding to the reference current $I_{REF}$ is equivalent to the reference current $I_{REF}$.

According to some embodiments, the voltage monitoring circuit 120 may comprise a second error amplifier (not shown in FIG. 1 and FIG. 2). For example, the second error amplifier may have a monitoring input terminal and a reference input terminal, where the monitoring input terminal of the second error amplifier may be arranged for inputting the input voltage $V_{IN}$ or a derivative thereof (e.g. a monitoring signal corresponding to the input voltage $V_{IN}$), and the reference input terminal of the second error amplifier may be arranged for inputting a reference signal corresponding to a predetermined voltage level.

Figure 3:
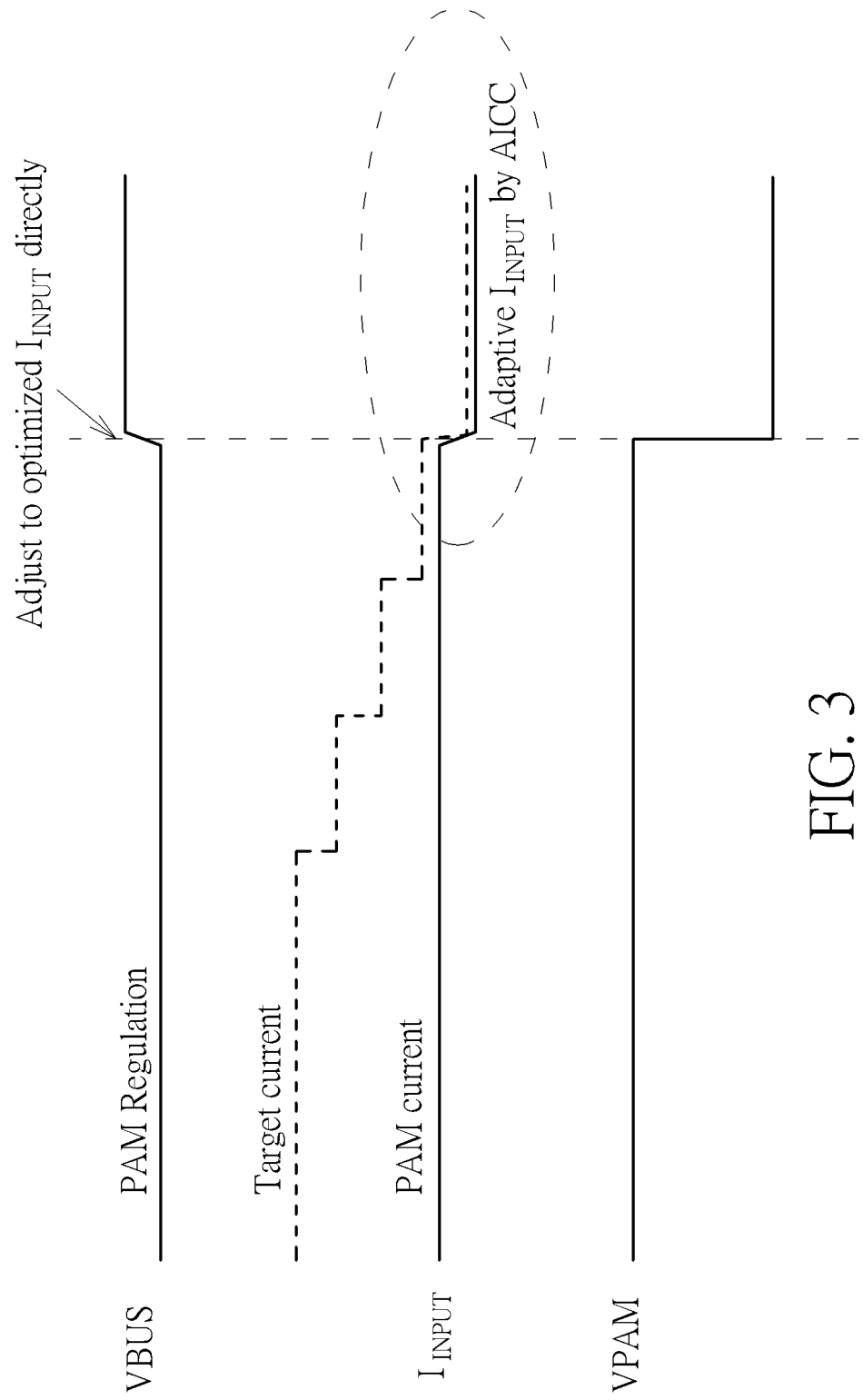
FIG. 3 illustrates a control scheme involved with the method shown in FIG. 2 according to an embodiment of the present invention.

FIG. 3 illustrates a control scheme involved with the method 200 shown in FIG. 2 according to an embodiment of the present invention, where the voltage signal VBUS can be taken as an example of the input voltage $V_{IN}$, the current signal $I_{INPUT}$ can be taken as an example of the input current $I_{IN}$, the voltage detection signal $V_{DET}$ can be taken as an example of the detection signal, and the digital signal VPAM can be taken as an example of the digital version of the detection signal. In this embodiment, the management circuit 130 can properly control operations of the regulator 105 in a situation where the power source such as the external power source mentioned in the embodiment shown in FIG. 1 (e.g. the AC-to-DC adaptor) does not have sufficient power-outputting capability.

According to this embodiment, the external power source may be a poor adaptor with poor power-outputting capability, and the management circuit 130 can perform adaptor management such as poor-adaptor management (PAM) according to this control scheme to achieve the best overall performance of the electronic device. For example, the management circuit 130 may perform PAM regulation on the voltage signal VBUS through the operation of Step 220, to prevent collapse of the input voltage $V_{IN}$ (e.g. the voltage signal VBUS) that is obtained from the power source such as the poor adaptor. As the management circuit 130 may allow the input current $I_{IN}$ such as the current signal $I_{INPUT}$ to reach the maximum current available from the power source such as the poor adaptor in Step 210, the maximum current available from the poor adaptor can be regarded as the PAM current.

As shown in FIG. 3, the target current depicted with dashed lines may indicate at least one portion (e.g. a portion or all) of the plurality of predetermined reference current values mentioned in Step 210. At the time point when the reference current $I_{REF}$ becomes smaller than the input current $I_{IN}$, a sudden drop of the input current $I_{IN}$ such as the current signal $I_{INPUT}$ (e.g. the decrement of the current signal $I_{INPUT}$ as shown in FIG. 3) may occur. In addition, at the same time (more particularly, the time point when the reference current $I_{REF}$ becomes smaller than the input current $I_{IN}$), a sudden rise of the input voltage $V_{IN}$ such as the voltage signal VBUS (e.g. the increment of the voltage signal VBUS as shown in FIG. 3) may occur, correspondingly. For example, the detection signal may be derived from the voltage signal VBUS, and may change at this time point, transiting from the first state (e.g. the first voltage level) to the second state (e.g. the second voltage level). As a result, the digital version of the detection signal, such as the digital signal VPAM shown in FIG. 3, may have an abrupt change at this time point, transiting from the first logical state to the second logical state. In this embodiment, the management circuit 130 may utilize this abrupt change to trigger the error control circuit 110 to limit the input current $I_{IN}$ of the regulator 105 to the target current value. Please note that, when the sudden rise of the input voltage $V_{IN}$ such as the voltage signal VBUS (e.g. the increment of the voltage signal VBUS as shown in FIG. 3) occurs, the management circuit 130 may adjust the current signal $I_{INPUT}$ to an optimized current thereof (labeled "optimized $I_{INPUT}$" in FIG. 3, for brevity) directly, where the input current $I_{IN}$ such as the current signal $I_{INPUT}$ changes from the PAM current to the optimized current by just one step. Based on adaptive input current control (AICC), the electronic device implemented according to the present invention can adaptively adjust the current signal $I_{INPUT}$ to the optimized current thereof according to the method 200. For brevity, similar descriptions for this embodiment are not repeated in detail here.

Figure 4:
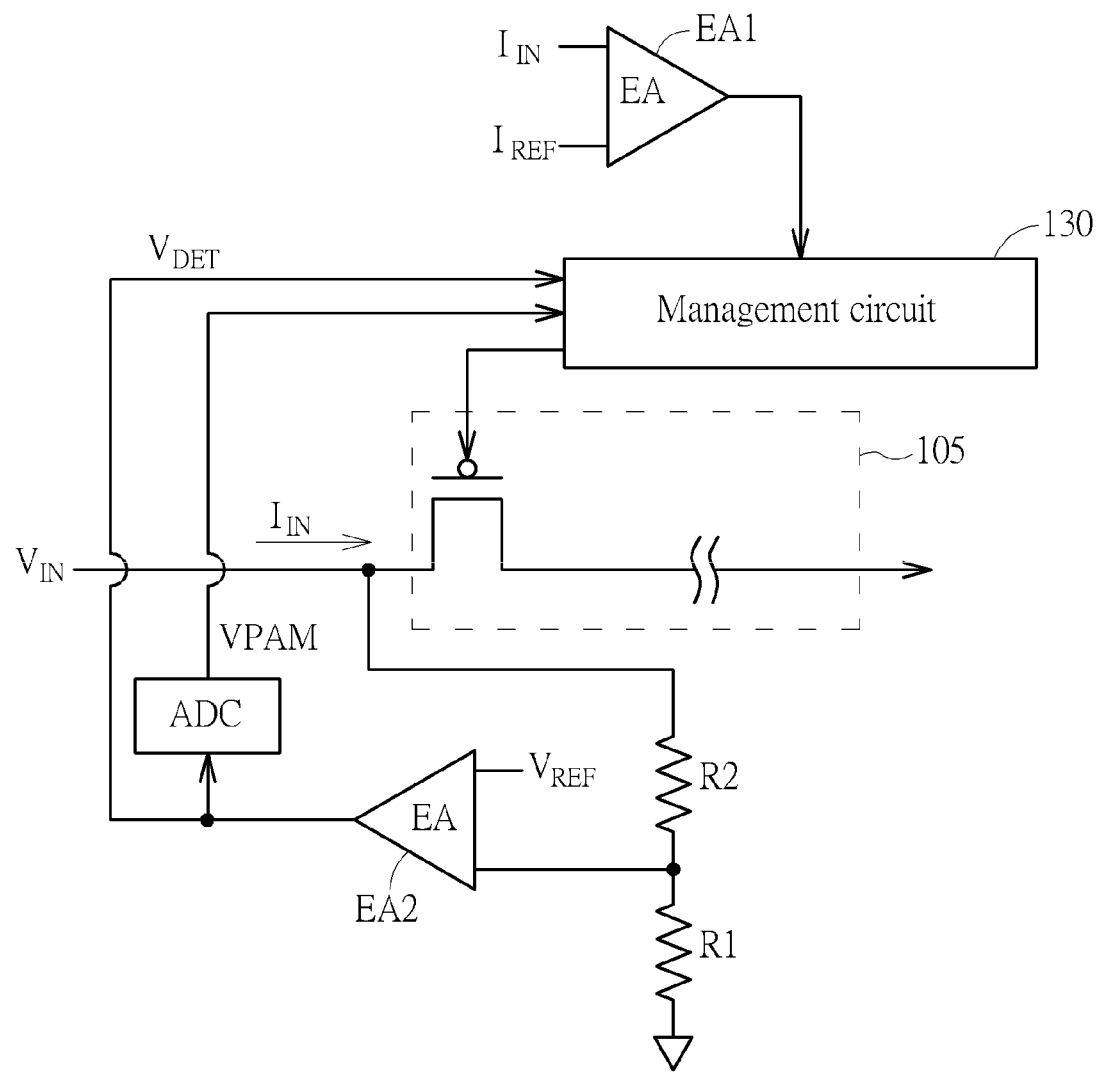
FIG. 4 illustrates some implementation details of the control scheme shown in FIG. 3 according to an embodiment of the present invention.

FIG. 4 illustrates some implementation details of the control scheme shown in FIG. 3 according to an embodiment of the present invention. In this embodiment, the error amplifier EA1 (labeled "EA" in FIG. 4, for brevity) can be taken as an example of the first error amplifier within the error control circuit 110, and the error amplifier EA2 (labeled "EA" in FIG. 4, for brevity) can be taken as an example of the second error amplifier within the voltage monitoring circuit 120. The analog-to-digital converter (ADC) coupled to the error amplifier EA2 may be arranged for performing analog-to-digital conversion on the detection signal such as the voltage detection signal $V_{DET}$ (which is equivalent to the output of the error amplifier EA2 in this embodiment), to generate the digital version of the detection signal, such as the digital signal VPAM. For example, the monitoring signal corresponding to the input voltage $V_{IN}$ (i.e. the monitoring signal to be input into the monitoring input terminal of the second error amplifier such as the error amplifier EA2) can be the voltage signal obtained from the node between the two resistors R1 and R2. In addition, the reference signal corresponding to the predetermined voltage level (i.e. the reference signal to be input into the reference input terminal of the second error amplifier such as the error amplifier EA2) can be the reference signal $V_{REF}$. Additionally, for better comprehension, it is illustrated that the monitoring signal corresponding to the input current $I_{IN}$ (i.e. the monitoring signal to be input into the monitoring input terminal of the first error amplifier such as the error amplifier EA1) may be equivalent to the input current $I_{IN}$, and more particularly, may be a copy of the input current $I_{IN}$, and the reference input terminal of the first error amplifier such as the error amplifier EA1 may be arranged for inputting the reference current $I_{REF}$. This is for illustrative purposes only, and is not meant to be a limitation of the present invention. According to some embodiments, the current monitoring circuit 102 may be arranged for sensing the input current $I_{IN}$ to generate the monitoring signal corresponding to the input current $I_{IN}$, such as a current monitoring signal $I_{IN}(1)$ which is related to the input current $I_{IN}$ (e.g. the magnitude of the current monitoring signal $I_{IN}(1)$ may be proportional to that of the input current $I_{IN}$). More particularly, the signal input into the monitoring input terminal of the first error amplifier such as the error amplifier EA1 may be replaced by the current monitoring signal $I_{IN}(1)$, and the signal input into the reference input terminal of the first error amplifier such as the error amplifier EA1 may be replaced by a reference signal $I_{REF}(1)$ having the same scale (and the same measurement unit) as that of the current monitoring signal $I_{IN}(1)$, where the reference signal $I_{REF}(1)$ can be taken as an example of the reference signal corresponding to the reference current $I_{REF}$. For example, when the input current $I_{IN}$ is equivalent to 1 ampere (A), the current monitoring circuit 102 may sense it and generate the current monitoring signal $I_{IN}(1)$ to be equivalent to 10 microampere (μA), which is (1/100000) of the input current $I_{IN}$. As the reference signal $I_{REF}(1)$ may be designed to have the same scale (and the same measurement unit) as that of the current monitoring signal $I_{IN}(1)$, the reference signal $I_{REF}(1)$ may be 10 μA for indicating that the reference current $I_{REF}$ mentioned in Step 210 is 1 A, or may be 20 μA for indicating that the reference current $I_{REF}$ mentioned in Step 210 is 2 A, or may be Ix μA (e.g. the notation "Ix" may represent a value greater than or equal to zero) for indicating that the reference current $I_{REF}$ mentioned in Step 210 is (Ix/10) A. In practice, it is easy to generate a current of 20 μA in the internal circuit of the electronic device instead of directly generating a current of 2 A. For brevity, similar descriptions for these embodiments are not repeated in detail here.

According to some embodiments, the current monitoring circuit 102 may be arranged for sensing the input current $I_{IN}$ to generate the monitoring signal corresponding to the input current $I_{IN}$, such as a voltage feedback signal VFB(1) which is related to the input current $I_{IN}$ (e.g. the magnitude of the voltage feedback signal VFB(1) may be proportional to that of the input current $I_{IN}$). More particularly, the signal input into the monitoring input terminal of the first error amplifier such as the error amplifier EA1 may be replaced by the voltage feedback signal VFB(1), and the signal input into the reference input terminal of the first error amplifier such as the error amplifier EA1 may be replaced by a reference signal $VFB_{REF}(1)$ having the same scale (and the same measurement unit) as that of the voltage feedback signal VFB(1), where the reference signal $VFB_{REF}(1)$ can be taken as an example of the reference signal corresponding to the reference current $I_{REF}$. For example, when the input current $I_{IN}$ is equivalent to 1 ampere (A), the current monitoring circuit 102 may sense it and generate the voltage feedback signal VFB(1) to be equivalent to 1 volt (V), which is the same value as that of the input current $I_{IN}$, without considering the units of V or A. As the reference signal $VFB_{REF}(1)$ may be designed to have the same scale (and the same measurement unit) as that of the voltage feedback signal VFB(1), the reference signal $VFB_{REF}(1)$ may be 1 V for indicating that the reference current $I_{REF}$ mentioned in Step 210 is 1 A, or may be 2 V for indicating that the reference current $I_{REF}$ mentioned in Step 210 is 2 A, or may be Vx V (e.g. the notation "Vx" may represent a value greater than or equal to zero) for indicating that the reference current $I_{REF}$ mentioned in Step 210 is Vx A. In practice, it is easy to generate a voltage of 2 V in the internal circuit of the electronic device instead of directly generating a current of 2 A. For brevity, similar descriptions for these embodiments are not repeated in detail here.

According to some embodiment, the ADC may be replaced by one of other types of circuits, such as a comparator, as long as generating the derivative of the detection signal (e.g. the digital version of the detection signal) to selectively trigger limiting the input current $I_{IN}$ of the regulator 105 to the target current value will not be hindered. For brevity, similar descriptions for these embodiments are not repeated in detail here.

According to some embodiment, it is unnecessary to implement the ADC, as long as utilizing the detection signal such as the voltage detection signal $V_{DET}$ to selectively trigger limiting the input current $I_{IN}$ of the regulator 105 to the target current value will not be hindered. For brevity, similar descriptions for these embodiments are not repeated in detail here.

According to some embodiment, the detection signal such as the voltage detection signal $V_{DET}$ can still be generated for the operation of Step 220, to prevent collapse of the input voltage $V_{IN}$ (e.g. the voltage signal VBUS) that is obtained from the power source such as the poor adaptor. However, it is unnecessary to utilize the detection signal such as the voltage detection signal $V_{DET}$ (or the aforementioned derivative of the detection signal, such as the digital signal VPAM) to selectively trigger limiting the input current $I_{IN}$ of the regulator 105 to the target current value. In these embodiments, limiting the input current $I_{IN}$ of the regulator 105 to the target current value may be automatically performed by the error control circuit 110, through adjusting the reference current $I_{REF}$ (e.g. making the reference current $I_{REF}$ change to the latest reference current value mentioned in Step 230). For brevity, similar descriptions for these embodiments are not repeated in detail here.

In the embodiment shown in FIG. 4, for better comprehension, a switching unit such as a Metal Oxide Semiconductor Field Effect Transistor (MOSFET) is illustrated within the regulator 105. This is for illustrative purposes only, and is not meant to be a limitation of the present invention. There may be one or more other components within the regulator 105. According to some embodiments of the present invention, the internal circuit of the regulator 105 may vary.

Figure 5:
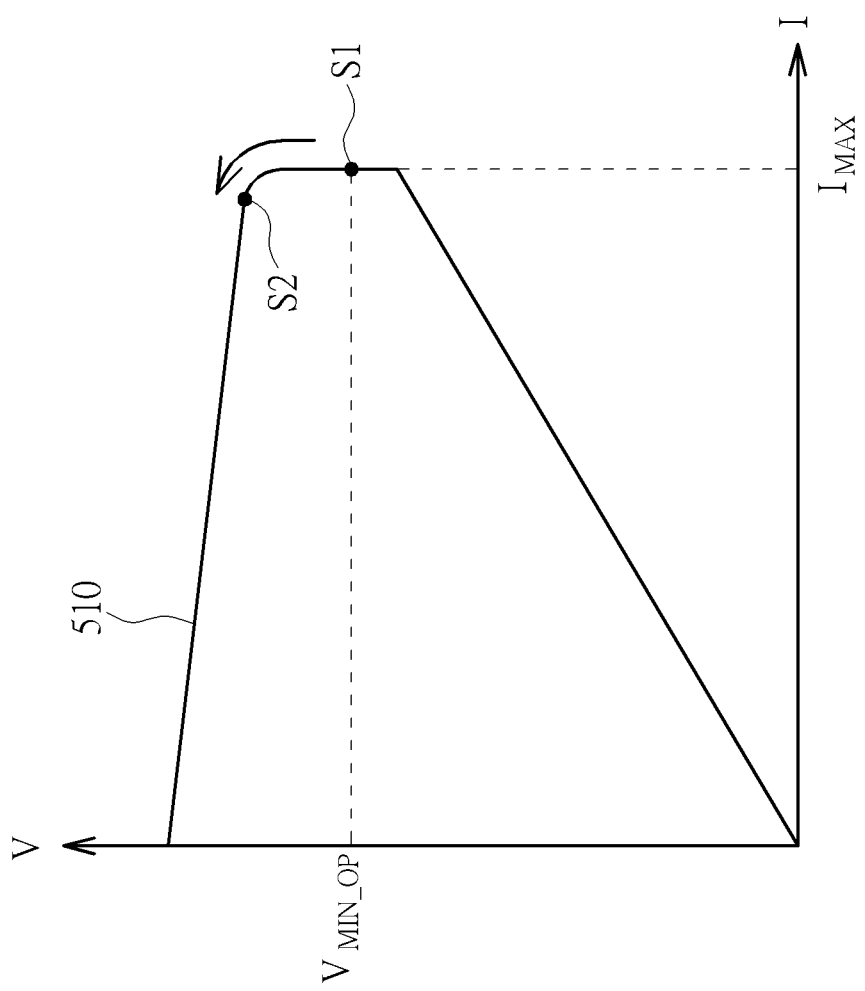
FIG. 5 illustrates a single transition involved with the method shown in FIG. 2 according to an embodiment of the present invention.

FIG. 5 illustrates a single transition involved with the method 200 shown in FIG. 2 according to an embodiment of the present invention. This single transition is a transition from an over-current state S1 to a target current state S2. For better comprehension, a curve 510 indicating a relationship between the output voltage and the output current of the power source such as the external power source mentioned in the embodiment shown in FIG. 1 (e.g. the AC-to-DC adaptor) is also illustrated, where the notation "$I_{MAX}$" may represent the maximum current available from the power source. For example, the maximum current $I_{MAX}$ may be 0.85 A in this embodiment.

As shown in FIG. 5, the management circuit 130 may adjust the input current setting according to the method 200, to allow the input current $I_{IN}$ of the regulator 105 to be equivalent to the maximum current $I_{MAX}$ (e.g. 0.85 A in this embodiment) at the over-current state S1 in an initial time phase, where the reference current may change starting from the one of the plurality of predetermined reference current values mentioned in Step 210. For example, the plurality of predetermined reference current values may comprise 2.0 A, 1.9 A, 1.8 A, etc. (e.g. 2.0 A, 1.9 A, 1.8 A, . . . , and 0.1 A), and the reference current may change (more particularly, decrease) starting from 2.0 A, with a decrement of 0.1 A. As a result, in the initial time phase, the management circuit 130 controls the regulator 105 to start with the over-current state S1. As the input voltage $V_{IN}$ and the input current $I_{IN}$ of the regulator 105 are equivalent to the output voltage and the output current of the power source such as the external power source (e.g. the AC-to-DC adaptor), respectively, the management circuit 130 may keep the input current $I_{IN}$ at the maximum current $I_{MAX}$ (e.g. 0.85 A in this embodiment), where based on the operation of Step 220, the management circuit 130 may keep the input voltage $V_{IN}$ at a predetermined operational voltage of the electronic device, such as the minimum operational voltage $V_{MIN\_OP}$ of the electronic device. When the reference current changes from 0.9 A to 0.8 A, it is the time point when the reference current becomes smaller than the input current $I_{IN}$ in this embodiment. As a result, in Step 230, the management circuit 130 may limit, by utilizing the error control circuit 110, the input current $I_{IN}$ of the regulator 105 to the target current value with the latest reference current value (e.g. 0.8 A) of the reference current $I_{REF}$ being utilized as the target current value. Therefore, right after the initial time phase, the management circuit 130 controls the regulator 105 to jump into target current state S2 with the single transition, rather than multiple transitions, where the input current $I_{IN}$ is directly programmed to the optimized level such as the target current value (e.g. 0.8 A), i.e. the maximum of the valid reference current values 0.8 A, 0.7 A, 0.6 A, etc. (e.g. 0.8 A, 0.7 A, 0.6 A, ..., and 0.1 A) within the plurality of predetermined reference current values in this embodiment. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing adaptive input current control in an electronic device, the method comprising steps of:
    in a first time period, monitoring the input current of the regulator according to a reference signal corresponding to a reference current, and decreasing the reference current by decreasing magnitude of the reference signal corresponding to the reference current, to make the reference current change starting from one of a plurality of predetermined reference current values, wherein the input current of the regulator is obtained from a power source, wherein the input current of the regulator is not limited to the reference current in the first time period;
    detecting an input voltage of the regulator to generate a detection signal corresponding to the input voltage of the regulator, to selectively trigger limiting output power of the regulator, wherein limiting the output power of the regulator is selectively triggered according to the detection signal; and
    at a time point when a monitoring result indicates that the reference current becomes smaller than the input current of the regulator, limiting the input current of the regulator in a second time period to the target current value with a latest reference current value of the reference current being utilized as the target current value, wherein the monitoring result is generated from monitoring the input current of the regulator, wherein the second time period is after the first time period.

2. The method of claim 1, wherein the one of the plurality of predetermined reference current values is greater than a maximum current available from the power source; and the method further comprises:
    allowing, in the first time period, the input current of the regulator to reach the maximum current available from the power source.

3. The method of claim 1, wherein the step of detecting the input voltage of the regulator to generate the detection signal corresponding to the input voltage of the regulator to selectively trigger limiting the output power of the regulator further comprises:
    detecting the input voltage of the regulator to generate the detection signal corresponding to the input voltage of the regulator, to selectively trigger limiting the output power of the regulator, in order to prevent collapse of the input voltage of the regulator that is obtained from the power source.

4. The method of claim 1, further comprising:
    according to a digital version of the detection signal, selectively triggering limiting the input current of the regulator to the target current value.

5. The method of claim 4, wherein the step of selectively triggering limiting the input current of the regulator to the target current value further comprises:
    before the digital version of the detection signal transits from a first logical state to a second logical state, preventing triggering limiting the input current of the regulator to the target current value.

6. The method of claim 5, wherein the step of selectively triggering limiting the input current of the regulator to the target current value further comprises:
    when the digital version of the detection signal transits from the first logical state to the second logical state, triggering limiting the input current of the regulator to the target current value.

7. The method of claim 1, wherein the step of decreasing the reference current to make the reference current change starting from the one of the plurality of predetermined reference current values further comprises:
    before the detection signal transits from a first state to a second state, keeping decreasing the reference current.

8. The method of claim 7, wherein the step of decreasing the reference current to make the reference current change starting from the one of the plurality of predetermined reference current values further comprises:
    when the detection signal transits from the second state to the first state, stopping decreasing the reference current, to utilize the latest reference current value of the reference current as the target current value.

9. The method of claim 1, wherein an error control circuit is arranged for performing error control during limiting the input current of the regulator to the target current value, and comprises a first error amplifier; and the first error amplifier has a monitoring input terminal and a reference input terminal, wherein the monitoring input terminal of the first error amplifier is arranged for inputting a monitoring signal corresponding to the input current of the regulator, and the reference input terminal of the first error amplifier is arranged for inputting the reference signal corresponding to the reference current.

10. The method of claim 1, wherein a voltage monitoring circuit is arranged for detecting the input voltage of the regulator to generate the detection signal corresponding to the input voltage of the regulator, and comprises a second error amplifier; and the second error amplifier has a monitoring input terminal and a reference input terminal, wherein the monitoring input terminal of the second error amplifier is arranged for inputting the input voltage of the regulator or a derivative thereof, and the reference input terminal of the second error amplifier is arranged for inputting a reference signal corresponding to a predetermined voltage level.

11. An apparatus for performing adaptive input current control in an electronic device, the apparatus comprising:
    a regulator, positioned in the electronic device, arranged for performing regulation for the electronic device;
    an error control circuit, positioned in the electronic device and coupled to the regulator, arranged for performing error control during limiting an input current of the regulator to a target current value, wherein the input current of the regulator is obtained from a power source;
    a voltage monitoring circuit, positioned in the electronic device and coupled to the regulator, arranged for detecting an input voltage of the regulator to generate a detection signal corresponding to the input voltage of the regulator; and a management circuit, positioned in the electronic device and coupled to the regulator, the error control circuit, and the voltage monitoring circuit, arranged for managing the regulator, wherein the management circuit monitors, in a first time period, by utilizing the error control circuit, the input current of the regulator according to a reference signal corresponding to a reference current, and decreases the reference current by decreasing magnitude of the reference signal corresponding to the reference current, to make the reference current change starting from one of a plurality of predetermined reference current values, wherein the input current of the regulator is not limited to the reference current in the first time period, wherein according to the detection signal, the management circuit selectively triggers limiting output power of the regulator, and at a time point when a monitoring result indicates that the reference current becomes smaller than the input current of the regulator, the management circuit limits, in a second time period, by utilizing the error control circuit, the input current of the regulator to the target current value with a latest reference current value of the reference current being utilized as the target current value, wherein the monitoring result is generated from monitoring the input current of the regulator wherein the second time period is after the first time period.

12. The apparatus of claim 11, wherein the one of the plurality of predetermined reference current values is greater than a maximum current available from the power source; and the management circuit allows, in the first time period, the input current of the regulator to reach the maximum current available from the power source.

13. The apparatus of claim 11, wherein according to the detection signal, the management circuit selectively triggers limiting the output power of the regulator, in order to prevent collapse of the input voltage of the regulator that is obtained from the power source.

14. The apparatus of claim 11, wherein according to a digital version of the detection signal, the management circuit selectively triggers limiting the input current of the regulator to the target current value.

15. The apparatus of claim 14, wherein before the digital version of the detection signal transits from a first logical state to a second logical state, the management circuit prevents triggering limiting the input current of the regulator to the target current value.

16. The apparatus of claim 15, wherein when the digital version of the detection signal transits from the first logical state to the second logical state, the management circuit triggers limiting the input current of the regulator to the target current value.

17. The apparatus of claim 11, wherein before the detection signal transits from a first state to a second state, the management circuit keeps decreasing the reference current.

18. The apparatus of claim 17, wherein when the detection signal transits from the second state to the first state, the management circuit stops decreasing the reference current, to utilize the latest reference current value of the reference current as the target current value.

19. The apparatus of claim 11, wherein the error control circuit comprises a first error amplifier; and the first error amplifier has a monitoring input terminal and a reference input terminal, wherein the monitoring input terminal of the first error amplifier is arranged for inputting a monitoring signal corresponding to the input current of the regulator, and the reference input terminal of the first error amplifier is arranged for inputting the reference signal corresponding to the reference current.

20. The apparatus of claim 19, wherein the voltage monitoring circuit comprises a second error amplifier; and the second error amplifier has a monitoring input terminal and a reference input terminal, wherein the monitoring input terminal of the second error amplifier is arranged for inputting the input voltage of the regulator or a derivative thereof, and the reference input terminal of the second error amplifier is arranged for inputting a reference signal corresponding to a predetermined voltage level.

* * * * *